(12) United States Patent
Hinton et al.

(10) Patent No.: US 9,958,068 B2
(45) Date of Patent: May 1, 2018

(54) PISTON HOUSING SYSTEM AND APPARATUS

(71) Applicant: GOODRICH CORPORATION, Charlotte, NC (US)

(72) Inventors: Jantzen Hinton, Celina, OH (US); Nathaniel J. Herrmann, Springfield, OH (US); Scott Whittle, Springboro, OH (US)

(73) Assignee: Goodrich Corporation, Charlotte, NC (US)

( * ) Notice: Subject to any disclaimer, the term of this patent is extended or adjusted under 35 U.S.C. 154(b) by 542 days.

(21) Appl. No.: 14/222,193

(22) Filed: Mar. 21, 2014

(65) Prior Publication Data
US 2015/0267812 A1 Sep. 24, 2015

(51) Int. Cl.
| | |
|---|---|
| *F16J 1/09* | (2006.01) |
| *B22F 3/105* | (2006.01) |
| *F16D 55/00* | (2006.01) |
| *B22F 3/00* | (2006.01) |
| *B22F 5/00* | (2006.01) |
| *B22F 5/10* | (2006.01) |

(52) U.S. Cl.
CPC .............. *F16J 1/09* (2013.01); *B22F 3/008* (2013.01); *B22F 3/1055* (2013.01); *B22F 5/008* (2013.01); *F16D 55/00* (2013.01); *B22F 5/10* (2013.01); *F16D 2055/0016* (2013.01); *F16D 2250/00* (2013.01); *Y02P 10/295* (2015.11); *Y10T 29/49249* (2015.01)

(58) Field of Classification Search
CPC . F15B 15/149; B60T 17/04; F16D 2055/0091
USPC ........................................................ 92/169.1
See application file for complete search history.

(56) References Cited

U.S. PATENT DOCUMENTS

| | | | | |
|---|---|---|---|---|
| 2,888,101 | A * | 5/1959 | Bayles .................... | F16D 55/40 188/106 P |
| 3,525,421 | A * | 8/1970 | Van Sickle ............. | F16D 55/32 188/218 XL |
| 3,691,914 | A * | 9/1972 | Reisacher ............... | F02F 1/002 123/193.3 |
| 4,554,892 | A * | 11/1985 | Amemori ................ | F01L 1/024 123/193.3 |
| 4,708,105 | A * | 11/1987 | Leydorf, Jr. .......... | F02F 7/0058 123/193.3 |

(Continued)

FOREIGN PATENT DOCUMENTS

| | | |
|---|---|---|
| DE | 1505600 | 11/1970 |
| EP | 1956261 | 8/2008 |
| EP | 2290255 | 3/2011 |

OTHER PUBLICATIONS

Extended European Search Report dated Jul. 1, 2016 in European Application No. 15158459.6.

*Primary Examiner* — Michael Leslie
*Assistant Examiner* — Matthew Wiblin
(74) *Attorney, Agent, or Firm* — Snell & Wilmer L.L.P.

(57) ABSTRACT

A piston housing manufactured by an additive manufacturing process is provided. The piston housing may comprise a plurality of chambers. The chambers may be in fluid communication with one another via non-linear fluid passageways. The non-linear fluid passageways may be defined in structural members configured to stiffen the piston housing.

10 Claims, 7 Drawing Sheets

(56) References Cited

U.S. PATENT DOCUMENTS

| | | | | |
|---|---|---|---|---|
| 5,404,846 A * | 4/1995 | VanRens | ............... | F02B 61/045 |
| | | | | 123/193.2 |
| 5,971,111 A * | 10/1999 | Maxwell | ................. | F16D 55/40 |
| | | | | 188/71.5 |
| 6,360,853 B1 * | 3/2002 | Maxwell | ................. | F16D 55/40 |
| | | | | 188/71.5 |
| 2007/0012173 A1 * | 1/2007 | Kurita | ................... | B22D 30/00 |
| | | | | 92/169.1 |
| 2007/0186767 A1 * | 8/2007 | Staudinger | .......... | F15B 15/2807 |
| | | | | 92/5 R |
| 2011/0048868 A1 * | 3/2011 | Stevenson | ............. | B29C 70/347 |
| | | | | 188/71.1 |
| 2015/0068629 A1 * | 3/2015 | Kottilingam | .......... | B22F 3/1055 |
| | | | | 137/808 |
| 2015/0323053 A1 * | 11/2015 | El-Wardany | ............ | F16H 55/06 |
| | | | | 74/457 |
| 2015/0345396 A1 * | 12/2015 | Zelesky | ................. | F01D 5/187 |
| | | | | 60/806 |

\* cited by examiner

PISTON HOUSING SYSTEM AND APPARATUS

FIELD

The present disclosure relates to piston housings, and more specifically, to brake piston housings made using additive manufacturing.

BACKGROUND

Typical piston housing may be forged structures. These structures typically include fluid passages. These fluid passages are typically drilled in the forged structures. As a result, the forged structures are typically designed to include straight passages (e.g., passages that are capable of being gun drilled). The drilling process may introduce stress concentrations into the various fluid chambers that the drilled passages connect. Moreover, forging operations generally require a large capital investment. Alternative manufacture technologies may allow for piston housings to be manufactured without the inherent limitations of typical piston housings (e.g., forged structures, stress concentrations, and/or the like).

SUMMARY

In various embodiments, a piston housing may comprise a body. The body may include a first fluid chamber, a non-linear fluid passage and a second fluid chamber. The non-linear fluid passage may be defined within a portion of the body. The non-linear fluid passage may be in fluid communication with the first fluid chamber. The second fluid chamber may be in fluid communication with the first fluid chamber via the non-linear fluid passage.

A method for manufacturing a piston housing may comprise defining a piston housing design having a first fluid chamber design connected to a second fluid chamber design via a structural member design; and manufacturing, by an additive manufacturing process, a piston housing based on the piston housing design, the piston housing comprising a first fluid chamber, manufactured based on the first fluid chamber design, in fluid communication with a second fluid, manufactured based on the second fluid chamber design, via a structural member, manufactured based on the structural member design, wherein the structural member defines a non-linear fluid passage between the first fluid chamber and the second fluid chamber.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
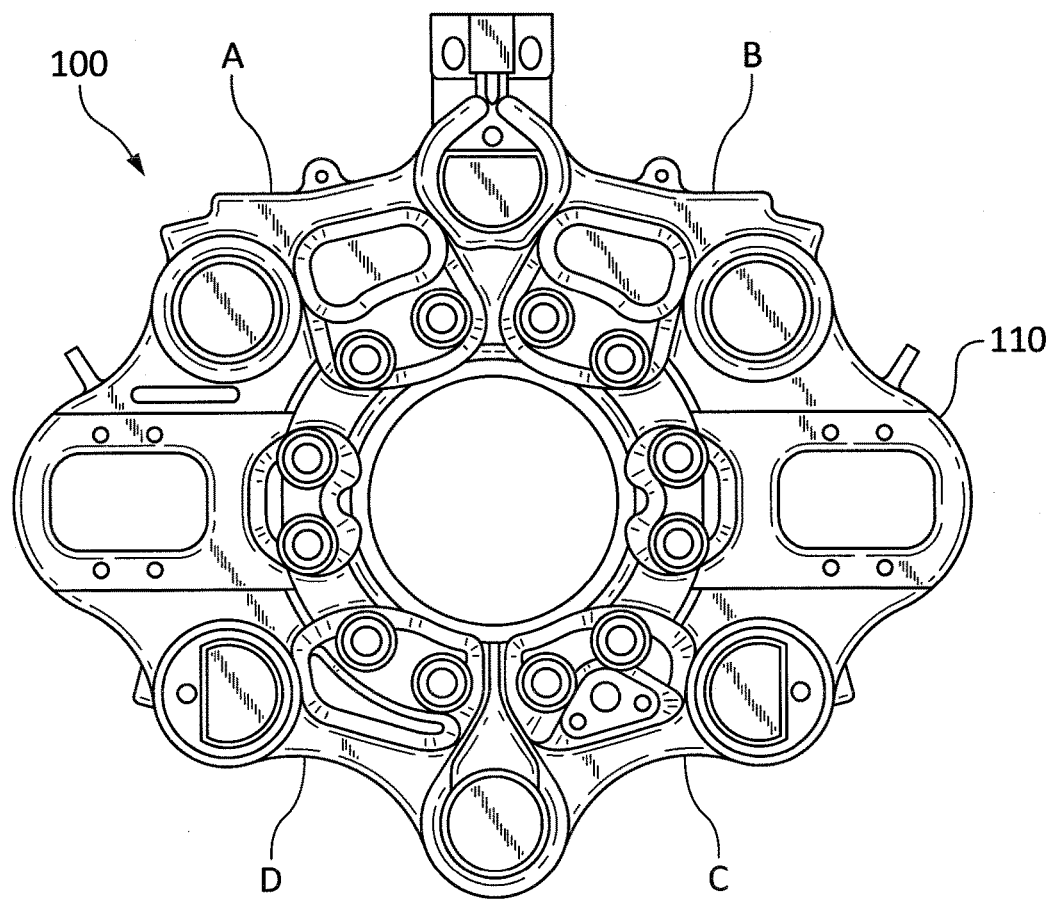
FIG. 1A illustrates a top view of a prior art piston housing.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Figure 1B:
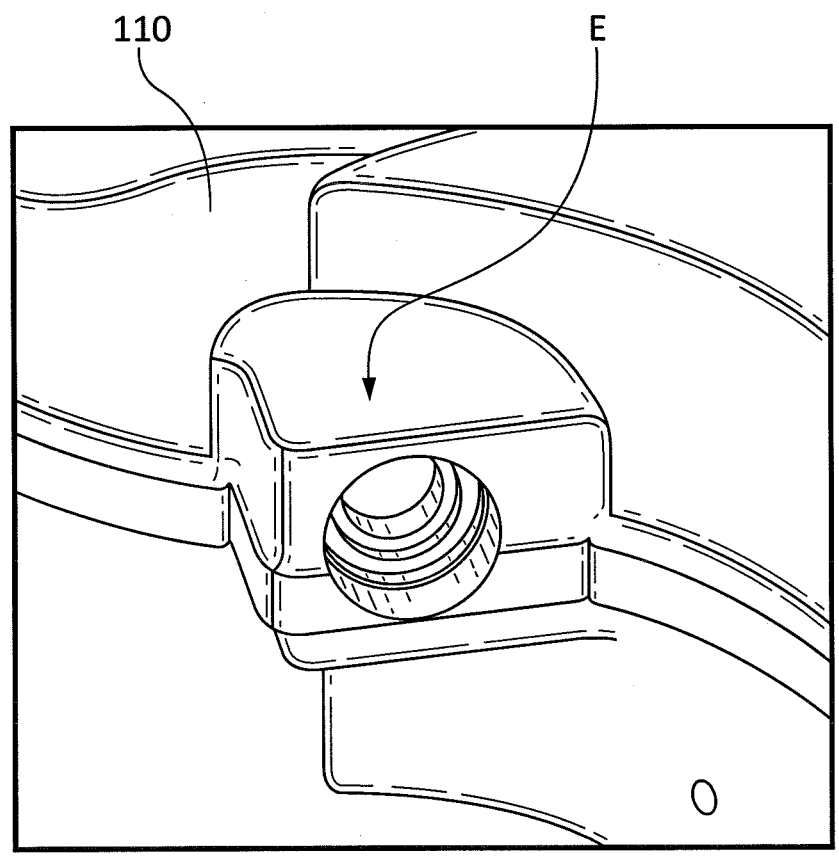
FIG. 1B illustrates a perspective view of a portion of prior art piston housing.

In various embodiments and with reference to FIGS. 1A and 1B, a body 110 of a traditional piston housing 100 is typically forged. Body 110 may be designed with extra material and/or structure that may be used as fluid passageways to connect the various fluid chambers in the forged piston housing body. For example, portion A, portion B, portion C and portion D as shown in FIG. 1A may be included in body 110 to allow for drilling of fluid passageways to connect the various fluid chambers of piston housing 100. Current manufacturing techniques and design methodologies for piston housings require that fluid passageways be gun-drilled. These drilling operations are able to create linear fluid passageways which may constrain the structure of body 110 (e.g., body 110 may include portion A, portion B, portion C and portion D to accommodate the linear fluid passageways). Moreover, the drilling operations may introduce stress concentration in fluid chambers where the fluid passage is drilled through the wall of the fluid chamber and into a side of the wall. The drilling operations may also create external holes (e.g., external hole E as shown in FIG. 1B) in body 110 requiring additional components (e.g., plugs, and/or the like).

Figure 2:
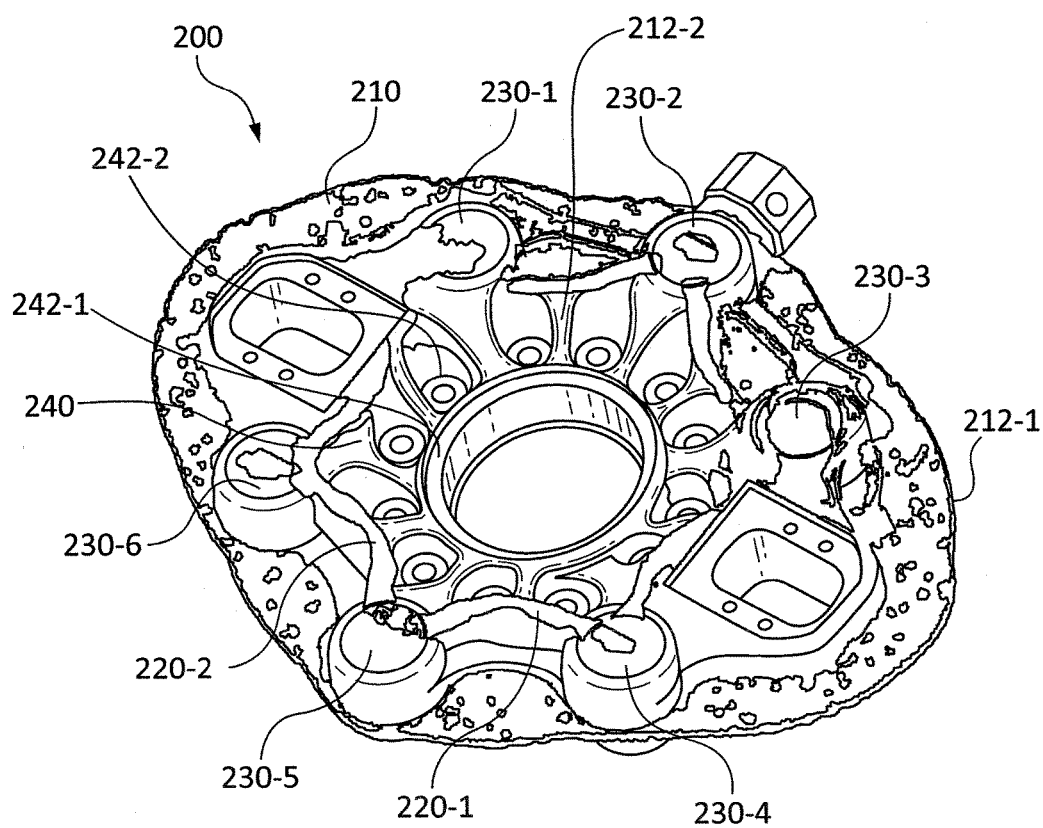
FIG. 2 illustrates a top perspective view of a piston housing, in accordance with various embodiments.

In various embodiments and with reference to FIG. 2, a piston housing 200 may comprise a body 210. Body 210 may define one or more vessels and/or chambers 230 (e.g., chamber 230-1, chamber 230-2, chamber 230-3, chamber 230-4, chamber 230-5, and chamber 230-6). Chamber 230 may be configured to receive hydraulic fluid and create hydraulic pressure. In this regard, one or more chambers 230 may be in fluid communication with one another (e.g., chamber 230-4 may be in fluid communication with chamber 230-5). One or more chambers 230 may be in fluid communication with one another via a passageway 220 (e.g., chamber 230-4 is in fluid communication with chamber 230-5 via passageway 220-1).

In various embodiments, one or more chambers 230 may also be in fluid communication with a source of hydraulic fluid via passageways 220. Passageways 220 (e.g., passageway 220-1, passageway 220-2, and/or the like) may allow for single and/or redundant sources of hydraulic fluid without requiring a source of hydraulic fluid for each chamber 230. In this regard, piston housing 200 may be in fluid communication with a first source or hydraulic fluid that is configured to supply chamber 230-1, chamber 230-2, and chamber 230-3, and a second source of hydraulic fluid that is configured to supply chamber 230-4, chamber 230-5, and chamber 230-6. Moreover, the fluid may be conducted to the various chambers 230 via various passageways 220.

In various embodiments, a topology-optimized geometry for piston housing 200 may be employed when using additive manufacturing techniques. In this regard, by using additive manufacturing techniques to create passageways 220 in piston housing 200, passageways 220 may be non-linear. In this regard, the design constraints that would allow the housing to be forged, cast and be capable of being drilled may not be imposed, which may allow the overall structure of piston housing 200 to be optimized. Moreover, piston housing 200 may be optimized to reduce the overall weight of piston housing 200 and to limit and/or eliminate an entry points associated with passageway drilling operations on the exterior of piston housing 200.

Figure 3:
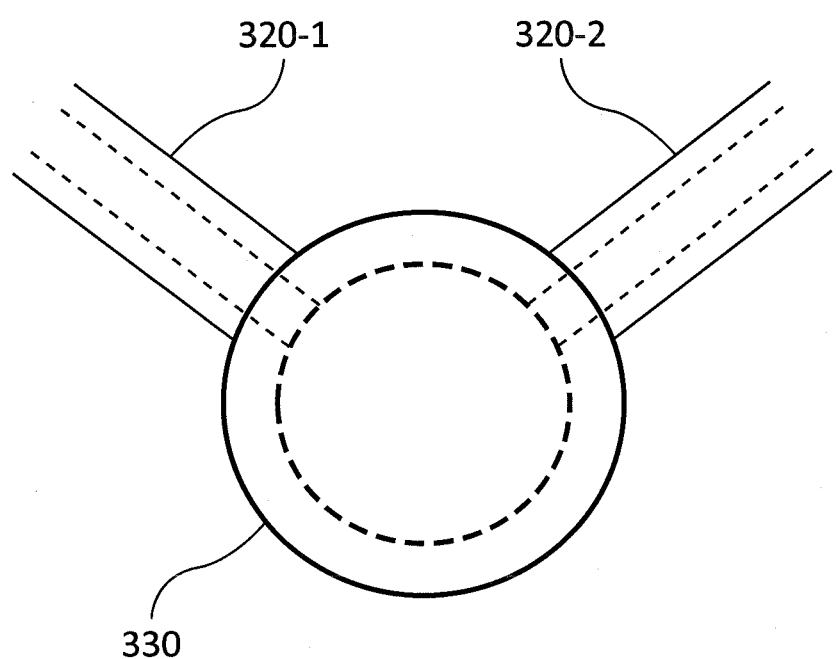
FIG. 3 illustrates a schematic view of a fluid chamber having integrally formed fluid passages, in accordance with various embodiments.

In various embodiments and with reference to FIG. 3, using embedded passageways 320 (e.g., passageway 320-1, passageway 320-2, and/or the like) via additive manufacturing techniques reduces the number of stress concentrations in chamber 330 (e.g. the pressure vessel). As discussed herein, gun-drilling operations may introduce stress concentrations where the drilling operation passes into and through a chamber. In contrast, embedded passageways 320 may be defined into chamber 330 without imparting stress concentrations associated with drilling and/or through drilling operations. Moreover, piston housings with embedded passageways 320 may also provide for designs with reduced part counts, reduced machining time, reduced weight and/or reduced maintenance operations when compared to typical piston housings.

In various embodiments and with reference to FIG. 2, piston housing 200 may comprise various supporting structures to distribute or counter-act applied loads. For example, body 210 may include one or more webs 212 (e.g., a flanges, flanges including hollow structures and/or structures suitable for improving stiffness or load bearing), such as, for example, web 212-1, web 212-2 and/or the like. Web 212 may have a non-uniform shape and/or geometry. Piston housing 200 may also comprise a suitable mounting interface 240. Mounting interface 240 may include one or more alignment holes 242 such as, for example, alignment hole 242-1, alignment hole 242-2 and/or the like. These alignment holes 242 may be configured to mate with other aircraft and/or brake structures including, for example, a torque plate, axle, brake pin, brake rod, or torque take-out, and/or the like.

Figure 4:
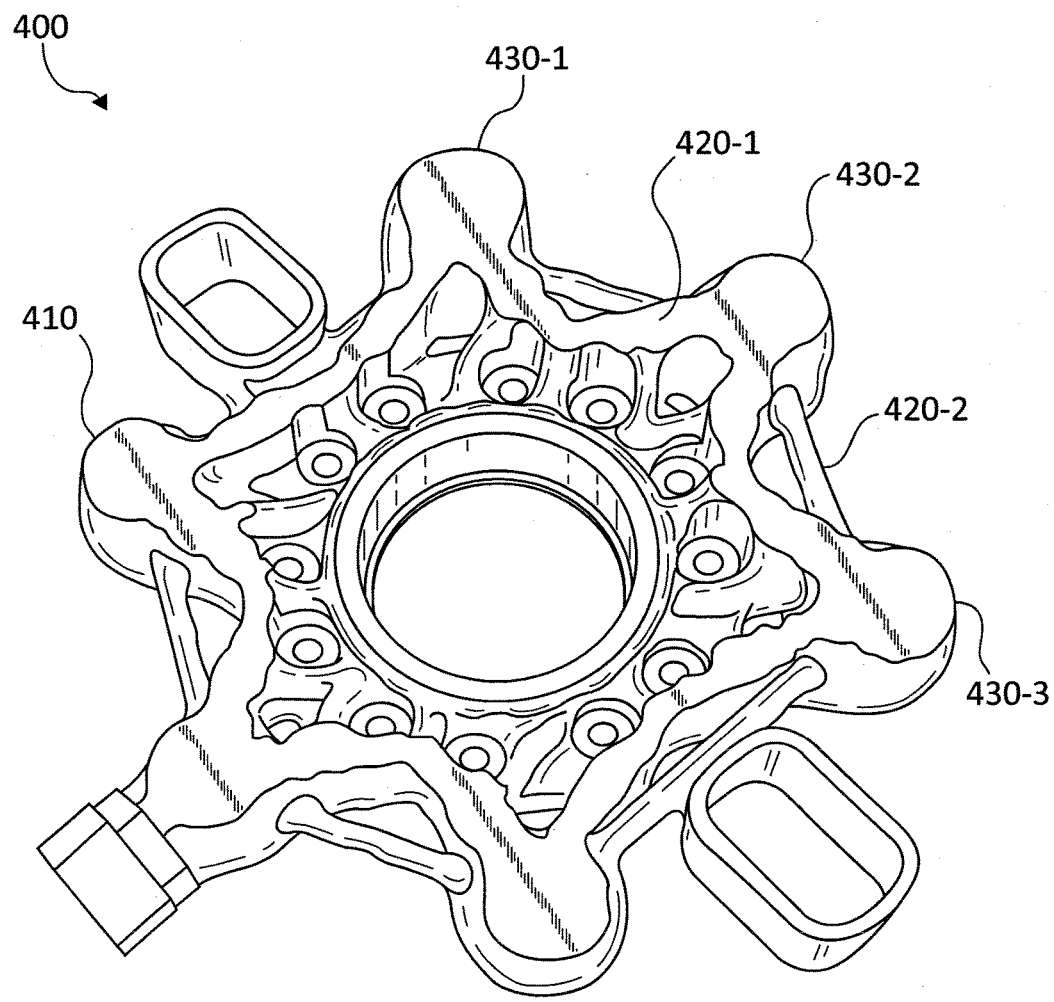
FIG. 4 illustrates a top perspective view of a piston housing, in accordance with various embodiments.

In various embodiments and with reference to FIG. 4, piston housing 400 and/or body 410 may include structural members that are configured to distribute or counter-act applied loads. For example, structural member 420 (shown as structural member 420-1 and structural member 420-2 in FIG. 4) may be a box beam comprising a hollow chamber and/or channel that defines a fluid passageway between one or more fluid chambers 430. For example, structure member 420-1 may define a fluid passageway between fluid chamber 430-1 and fluid chamber 430-2. Structure member 420-2 may define a fluid passageway between fluid chamber 430-2 and fluid chamber 430-3.

In various embodiments and with reference to FIG. 4, piston housing 400 may also employ structures and/or a geometry that are optimized to bear loads during operation and to minimize the overall weight of piston housing 400. Moreover, piston housing 400 may be configured with any suitable interface geometry that would be required to install piston housing 400 on an aircraft. Body 410 may also be optimized with ribs, support elements, stress relieving and/or compensation structures and/or the like. Moreover, these structures may be optimized and/or may include internal passageways that could be created with additive manufacturing technologies but may not be capable of being created by other manufacturing methods, including, for example, forging and drilling.

Figure 5:
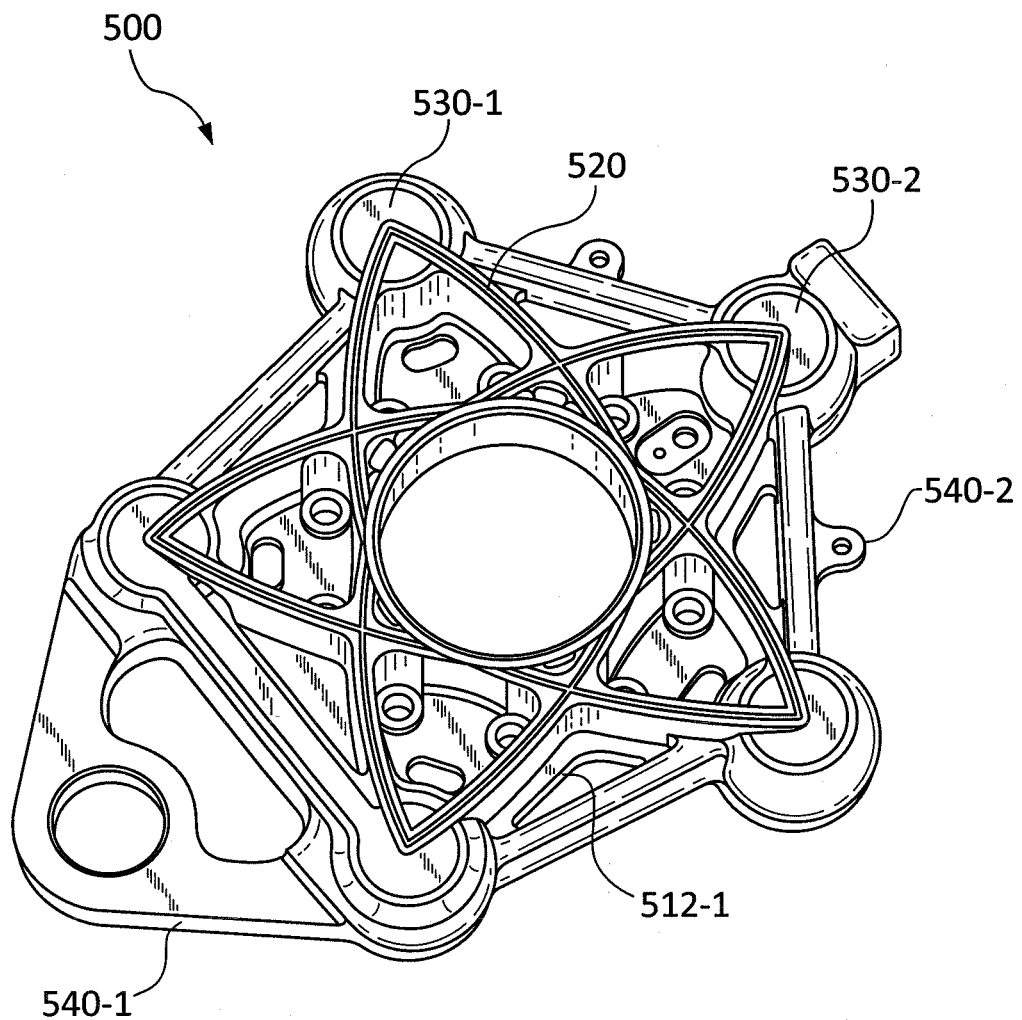
FIG. 5 illustrates a top perspective view of a piston housing, in accordance with various embodiments.
Figure 6:
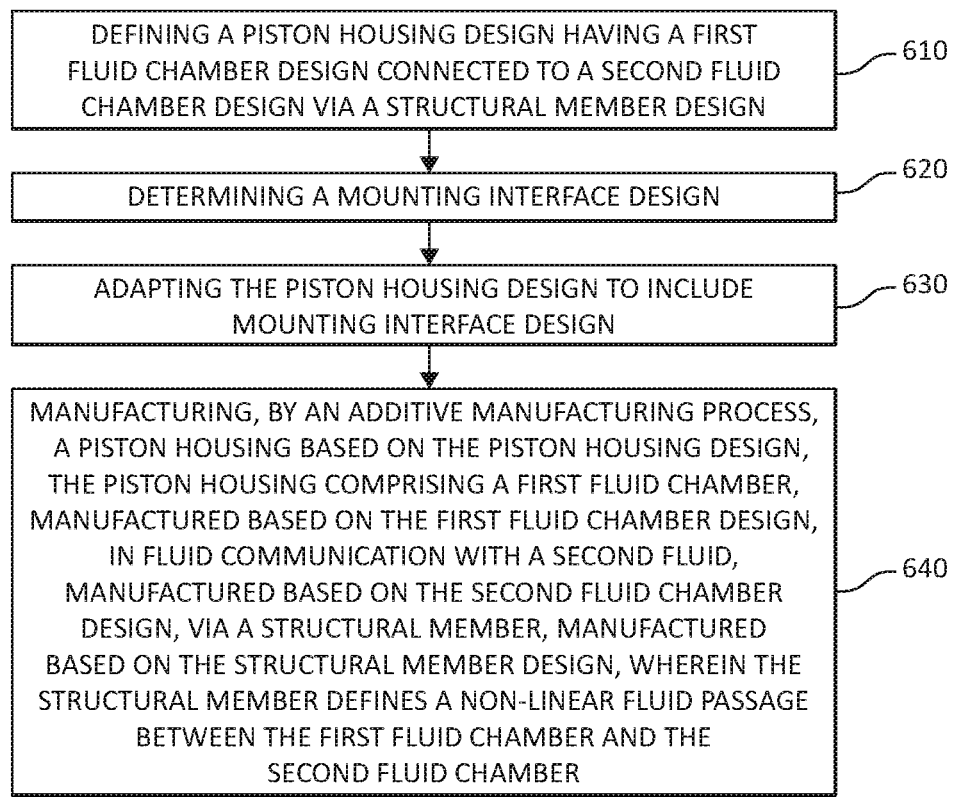
FIG. 6 is a process flow for manufacturing a piston housing with additive manufacturing, in accordance with various embodiments.

In various embodiments and with reference to FIGS. 5 and 6, an additive manufacturing process for a piston housing design may include defining a piston housing design having a first fluid chamber design connected to a second fluid chamber design via a structural member design (Step 610). The process may further include determining a mounting interface design based on the type of aircraft, installation location, and/or other interface parameters of an application (Step 620). The process may further include adapting the piston housing design to include mounting interface design (Step 630). Piston housing 500 may be created by manufacturing, by an additive manufacturing process, a piston housing 500 based on the piston housing design, the piston housing comprising a first fluid chamber 530-1, manufactured based on the first fluid chamber design, in fluid communication with a second fluid chamber 530-2, manufactured based on the second fluid chamber design, via a structural member 520, manufactured based on the structural member design, wherein the structural member defines a non-linear fluid passage between the first fluid chamber and the second fluid chamber (Step 640). In this regard, additive manufacturing technologies allow for the internal structure of the piston housing to no longer be limited by machining capabilities.

In various embodiments and with reference to FIG. 5, additive manufacturing techniques may allow structures to be optimized for load and/or bending. For example, structures may be optimized with webs 512 (e.g., web 512-1, and/or the like), web 512-1 defining hollow structures, honeycomb structures, interface and/or mounting structures (e.g., interface structures 540-1, interface structure 540-2 and/or the like) and/or the like to improve stiffness, reduce weight and account for bending loads created during operation. For example, cavities may be formed as box beams and/or structural members with fluid channels (e.g., structural member 520). In this regard, the hollow chamber and/or channel within the structural member and/or beam may be configured to conduct fluid between chambers 530 while the overall structure of the beam may reduce, and/or adequately bear load and/or bending experienced by the piston housing during operation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A piston housing, comprising:
    a body including:
        a first fluid chamber,
        a first structural member comprising a first hollow chamber defining a non-linear fluid passage, the non-linear fluid passage in fluid communication with the first fluid chamber,
        a second fluid chamber in series fluid communication with the first fluid chamber via the non-linear fluid passage,
        a second structural member configured as a box beam extending between the first fluid chamber and the second fluid chamber, the second structural member comprising a second hollow chamber,
        and
        a web disposed between the first structural member and the second structural member, wherein the web defines a hollow portion disposed between the first structural member and the second structural member,
    wherein the first structural member and the second structural member are formed from an additive manufacturing process,
    wherein the second structural member encloses the second hollow chamber.

2. The piston housing of claim 1, wherein the body is formed from the additive manufacturing process.

3. The piston housing of claim 2, wherein the additive manufacturing process is configured to reduce stress concentrations in the first fluid chamber.

4. The piston housing of claim 1, wherein the body comprises a mounting interface.

5. The piston housing of claim 1, wherein the non-linear fluid passage is a curved passage.

6. The piston housing of claim 1, wherein at least one of the web and the box beam is configured to resist at least one of a bending load and a torque.

7. A method, comprising:
    defining a piston housing design having a first fluid chamber design connected in series to a second fluid chamber design via a first structural member design, wherein the first structural member design includes a first hollow chamber defining a non-linear fluid passage and a second structural member design, wherein the second structural member design includes a box beam and a web; and
    manufacturing, by an additive manufacturing process, a piston housing based on the piston housing design, the piston housing comprising:
        a first fluid chamber, manufactured based on the first fluid chamber design;

a second fluid chamber, manufactured based on the second fluid chamber design;

a first structural member, manufactured based on the first structural member design, wherein the first structural member includes the first hollow chamber defining the non-linear fluid passage, whereby the first fluid chamber is in series fluid communication with the second fluid chamber; and a second structural member, manufactured based on the second structural member design, wherein the second structural member includes a second hollow chamber;

wherein the second structural member includes the box beam disposed between the first fluid chamber and the second fluid chamber, the web disposed between the box beam and the non-linear fluid passage, wherein the web defines a hollow portion disposed between the box beam and the non-linear fluid passage, wherein the second structural member encloses the second hollow chamber.

8. The method of claim 7, further comprising:
determining a mounting interface design; and
adapting the piston housing design to include the mounting interface design.

9. The method of claim 7, wherein the piston housing further comprises a plurality of fluid chambers in fluid communication with each other, and wherein the plurality of fluid chambers include the first fluid chamber and the second fluid chamber.

10. The method of claim 7, wherein the piston housing includes an interface structure.

* * * * *